United States Patent [19]

Leiber

[11] 4,230,375
[45] Oct. 28, 1980

[54] ANTI-SKID BRAKING SYSTEM

[75] Inventor: Heinz Leiber, Leimen, Fed. Rep. of Germany

[73] Assignee: Robert Bosch GmbH, Stuttgart, Fed. Rep. of Germany

[21] Appl. No.: 877,648

[22] Filed: Feb. 14, 1978

[30] Foreign Application Priority Data

Feb. 15, 1977 [DE] Fed. Rep. of Germany ....... 2706278

[51] Int. Cl.³ ............................................. B60T 8/02
[52] U.S. Cl. ..................................... 303/105; 303/103
[58] Field of Search ................ 303/91, 103, 105, 106, 303/109

[56] References Cited

U.S. PATENT DOCUMENTS 4,054,328 10/1977 Leiber ................................. 303/103

Primary Examiner—Reinhard J. Eisenzopf
Attorney, Agent, or Firm—Edwin E. Greigg

[57] ABSTRACT

An anti-skid or anti-wheel-lock system for motor vehicles in which a rotation sensor sends signals to a processor that determines if wheel lock is imminent and then sends brake force reduction control signals to a brake force controller. The control signals are first passed through a time filter having a plurality of discrete paths with differing signal constants. The selection of the filtering time constant is made by a circuit which measures the period between control signals against a reference time and changes the filtering time constant in accordance with the results of the measurement.

10 Claims, 3 Drawing Figures

ANTI-SKID BRAKING SYSTEM

BACKGROUND OF THE INVENTION

The invention relates to anti-skid systems for motor vehicles. Anti-skid systems or sometimes called anti-wheel-lock systems usually include a transducer associated with at least one vehicle wheel which generates signals related to the regularity of rotation of the wheel and feeds them to a processor that initiates appropriate pressure decreases at the wheel which tends to lock up. Normally, the propagation of signals to the pressure actuators is subject to an inherent time filtering, i.e. the system does not respond to rapidly repeated actuation signals due to its inherent filtering characteristics. This inertia toward the propagation of actuation signals, i.e. filtering, is actually necessary so as to prevent undesired brake pressure decay due to erroneous or spurious signals or erratic vehicle motions. The pressure decrease signal is tested for a given duration before it is actually used to lower the braking pressure. A kind of filtering against spurious signals is also provided by the fact that genuine signals do not occur until relatively high thresholds of actuation have been passed, for example wheel acceleration or deceleration and wheel slippage.

The filtering time constant and the high actuation thresholds also affect the period of the control loop cycle. This inherent control period or frequency also depends on the condition of the road and is thus a variable. However the inherent period of the control process may not be made arbitrarily small, i.e. the inherent control frequency must not exceed a certain limit which is generally set by the resonant frequency of the vehicle chassis.

OBJECT AND SUMMARY OF THE INVENTION

It is thus a principal object of the invention to provide a method and apparatus for subjecting signals from wheel transducers to selective temporal filtering adapted to prevailing conditions. This object is attained according to the invention by changing the filtering time constant and/or the magnitude of the thresholds which must be passed by the signals indicating the tendency to wheel lock-up. For this purpose, there is provided a measuring system which measures a variable that is a function of the period of the control loop cycles and which engages the filtering circuit in the sense that when the control loop period is small, the filtering time and/or the thresholds are increased while, when the control loop period is great, the filtering time and/or the thresholds are reduced.

In a preferred exemplary embodiment of the invention, the filtering of the wheel signal is performed in discrete steps among several available filtering time constants and/or thresholds. It is particularly advantageous if the filtering time constant is set to the smallest value when braking has been completed. Thresholds which may be switched are, for example, those relating to wheel slippage, or to changes in vehicle speed, when using digital differentiation, for example by changing the time constant of the differentiator.

The teaching of the invention may be put into practice, for example, by providing a minimum and/or a maximum value for the control loop period within the measuring system and making a comparison with one of these values. If the minimum value or the maximum value are exceeded, there would then take place an increase or a decrease of the filtering time constant or the thresholds. This may be done in steps according to one embodiment of the invention, i.e. when it is first determined that the control period is too small, the filtering time constant is switched to the next higher time or the next higher signal threshold. If both a time filtering and an amplitude filtering are provided, it is advantageous to perform the time filtering first.

The invention will be better understood as well as further objects and advantages thereof become more apparent from the ensuing detailed description of a preferred exemplary embodiment taken in conjunction with the drawing.

DESCRIPTION OF THE PREFERRED EMBODIMENT

Figure 1:
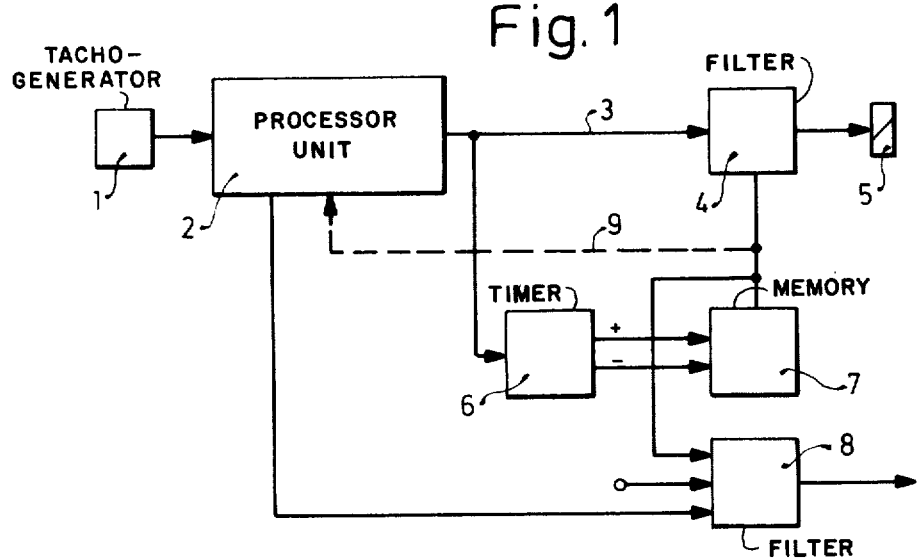
FIG. 1 is a block diagram of a first exemplary embodiment of the invention.

Turning now to the block diagram of FIG. 1, there will be seen a pulse generator or tacho generator 1 associated with one of the vehicles wheels for generating a signal related to the wheel speed. The signal from the tacho generator 1 is applied to a processor 2 which is of known construction, e.g., as described in U.S. Pat. Nos. 3,754,797 or 3,672,730, and will not be described in further detail. The essential characteristic of the processor is that it analyzes the signal which it receives from the tacho generator and derives therefrom actuation signals for a decrease of the braking pressure in the associated wheel so as to prevent wheel locking. These pressure control signals are fed via a line 3 to a signal filter 4 whence they pass to the pressure control element 5 which is capable of decreasing the braking pressure at the brake associated with the wheel on which the tacho generator 1 is mounted. In known brake force control systems, no separate filtering element such as the element 4 will be provided, rather the natural filtering time of the system is a composite of signal propagation times, circuit response times, etc.

In the embodiment described here, the pressure reduction signals from the processor are also applied to a timing circuit 6 which interrogates the period between actuation signals on the line 3 and generates an ouptut signal on a plus line if that period is too short, thus requiring a prolongation of the filtering time constant while it generates a signal on the minus line if the period between control signals is too long, thus requiring a reduction in the filtering time constant.

The signals from the timer 6 are stored in a memory 7 whence they engage the signal filter 4. There is also shown a dashed line 9 which connects the output of the memory to the processor and which may be used to increase the threshold at which wheel slippage and/or wheel speed changes become effective. The switchover of the thresholds may occur at the same time as a change in the time constant of the filter 4 but may also be performed alternatively thereto or subsequently thereto.

There is also provided a further signal filter 8 which puts out an actuation signal for a safety circuit as will be explained further on.

Figure 2:
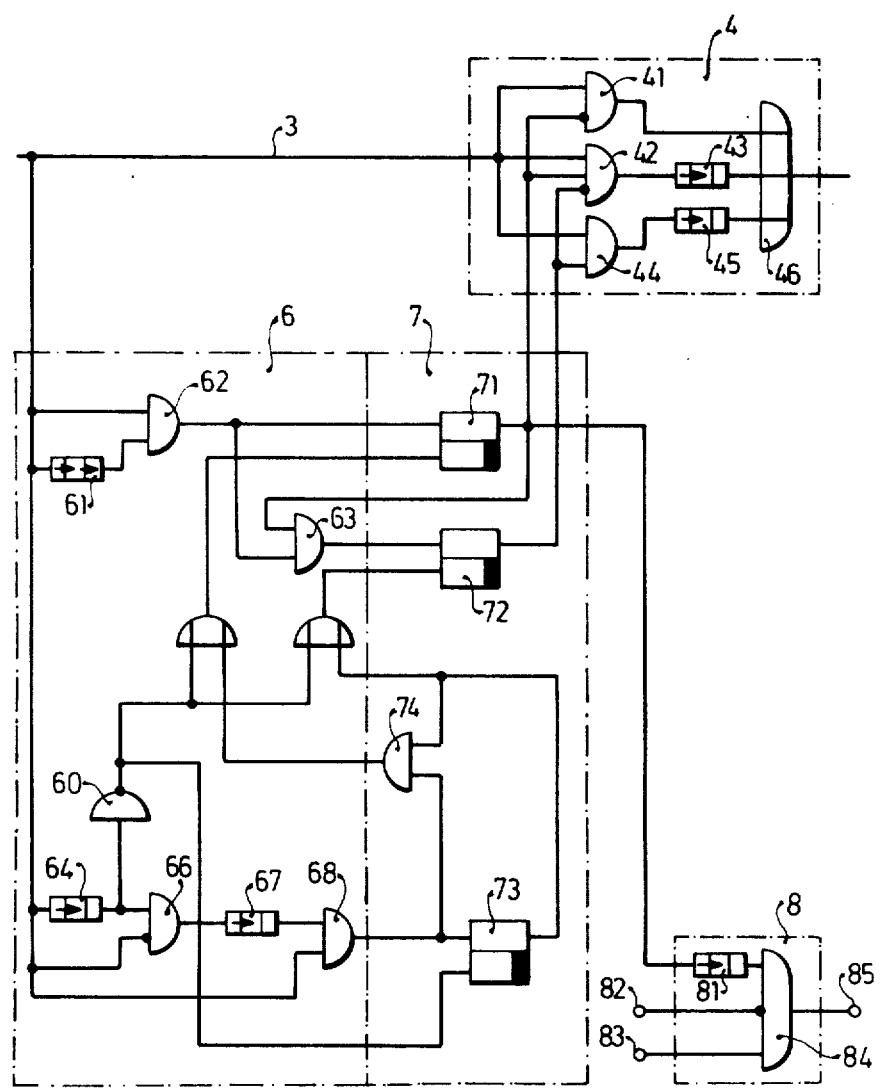
FIG. 2 is a logical circuit diagram of the various building blocks of FIG. 1.

The various building blocks of FIG. 1 are illustrated in greater detail within dash-dotted lines of the illustration of FIG. 2. In particular, the signal filter 4 is seen to include three logical AND gates 41, 42 and 44 which are actuated alternatively and which, when actuated, provide different filter time constants. For example, if the gate 41 is open, i.e. capable of passing signals, the time constant of the system will be the natural filter time constant integrated in the system which is specified as the time $T_1$, whereas when the gate 42 is open, the filtering time will be $T_2 = T_1 + \Delta T_1$, i.e. the effective filtering time will be a sum of the inherent time constant $T_1$ and the time constant $\Delta T_1$ of a timing element 43. Finally, if the gate 44 is open, the effective filtering time constant will be $T_3 = T_1 + \Delta T_2$, where $\Delta T_2$ is the time constant of a timing element 45. The three ouputs from the AND gates are then fed to respective inputs of an OR gate 46 the output of which is connected to the pressure actuation element 5 of FIG. 1.

Under normal conditions, the AND gate 41 will be open and thus the effective time constant will be $T_1$. Every pressure reduction pulse present on the line 3 is also applied to a timing element 61 which is thereby set with a small delay and which then generates an output signal for a predetermined period of time, for example 100 ms. If a further pressure reduction signal occurs within that time span of 100 ms, it will be passed by the AND gate 62 and will cause the bistable flip-flop 71 to be set. The output signal of the latter then blocks the AND gate 41, and opens the AND gate 42, thereby changing the filtering time constant from $T_1$ to $T_2$ and extending it by for example 10 ms. This increase will have taken place because the effective period of the control loop was actually shorter than the predetermined time constant of 100 ms as measured by the timing element 61.

If the next measurement of the control period still shows that the period is smaller than the time constant of the timing element 61, the output pulse from the AND gate 62 now passes over the opened AND gate 63 and sets a second bistable flip-flop 72. As a result, the AND gate 42 closes and the AND gate 44 opens so that the effective filter time constant is now $T_3$ and is increased by, for example, 30 ms with respect to the normal time constant $T_1$.

Every pulse on the line 3 also sets a timing element 64 having a time constant of approximately 5 seconds. When the pressure reduction signal has terminated, the output signal from the timing element 64 passes through the AND gate 66 and sets a delay element 67. When the delay time of the element 67, for example 400 ms, has passed, and a new pressure reduction signal is received thereafter, it may then travel through the AND gate 68 to set the bistable flip-flop 73. This resets the bistable flip-flop 72 if it had been previously set and the effective time constant then becomes $T_2$ again. If the subsequent period is measured to be still greater than the time constant of the timing element 67, the pressure reduction pulse may travel through the AND gate 74 to reset the bistable flip-flop 71 if it had been previously set, thereby returning the filtering time to the basic time constant $T_1$.

The output of the timing element 64 will disappear for example 5 seconds after the final pressure reduction signal. The pulse then generated at the output of the inverter 60 sets all three bistable elements 71, 72 and 73 back into their initial state.

The signal which is present at the output of the bistable element 71 may also be used to actuate a safety circuit. If, for example, the transducer 1 is defective, for example if several teeth are missing in an induction gear, and if it thus generates signals which are then erroneously translated by the processor to be wheel slippage signals, and if no actual braking takes place, the safety circuit may be used to prevent unnecessary actuation of the brake force modulator. For example, if the signal at the output of the bistable element 71 is present for 10 seconds, i.e. the time constant of the timing element 81, without simultaneous actuation of the brake light switch whose signal is applied at the contact 82, and for a vehicle speed which is greater for example than 70 km/h as signaled to the contact 83, a gate 84 is opened thereby generating a signal on a contact 85 for actuating a subsequent safety circuit, not shown.

Figure 3:
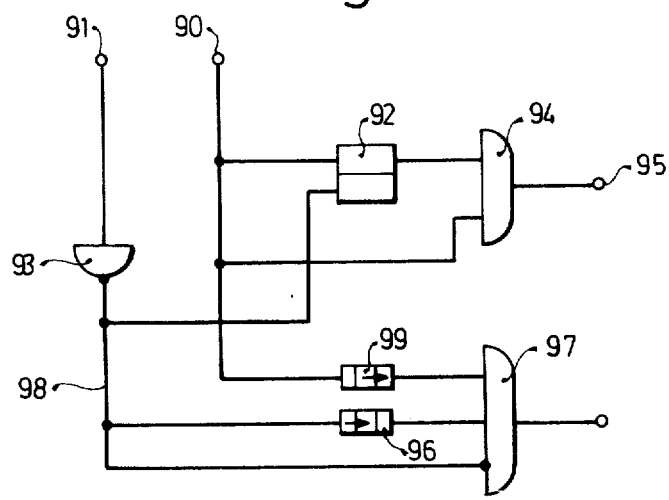
FIG. 3 is a diagram of auxiliary circuitry to be used with the circuit of FIG. 2.

It may happen in the operation of the braking system of the vehicle that two pressure reductions take place without an intermediate pressure increase, for example when the pressure reduction occurs discretely. This behavior would tend to signal a very short control loop period and thus initiate an unnecessary and unjustified correction of the filtering time constant. This erroneous response may be prevented by the auxiliary circuit illustrated in FIG. 3. In that circuit, a contact 90 receives the basic pressure reduction signal present on line 3 of FIGS. 1 and 2 while the contact 91 receives an actuation signal for an inlet valve which holds the braking pressure constant when actuated by itself. The occurrence of a pressure reduction signal on line 3 sets the bistable element 92 of FIG. 3. If a pressure increase then occurs, i.e. if the signal on line 91 for actuating the inlet valve terminates, the inverter 93 then resets the bistable element 92. However, if a second pressure reduction signal follows the first pressure reduction signal without a disappearance of the signal on contact 91, this second pressure reduction signal will pass through the AND gate 94 to the output contact 95. The occurrence of this signal at the contact 95 may be used to prevent a change of the filtering constant of the filter 4, for example by blocking the AND gates 62 and 68. The output signal at the contact 95 may also be used for direct actuation of a brake outlet valve while bypassing the filtering circuits.

The filtering time constant may also be increased if the pressure admission valve actuated by the signal on line 91 opens for too short a period of time. For this purpose, the signal from the inverter 93 is fed to a delay element 96 where it is inverted and fed to the AND gate 97. Thus, the AND gate 97 carries an output signal only if, after the expiration of the time constant of the element 96, no signal is present on the line 98. The output signal from the AND gate 97 may then be coupled in behind the AND gate 62 of FIG. 2 and will result in an effective increase of the filtering time constant. It is the purpose of the timing element 99 to prevent a switch-over of the filtering circuit if the control loop is inoperative, i.e. if no pressure reduction signal has yet been received. For this purpose, the timing element 99 is set with a relatively long time constant by a pressure reduction signal and continues to supply a signal while in its unstable state.

The foregoing relates to preferred exemplary embodiments of the invention, it being understood that other embodiments and variants thereof are possible within the spirit and scope of the invention.

What is claimed and desired to be secured by Letters Patent of the United States is:

1. An anti-skid braking system for a vehicle having wheel brakes including a pressure inlet valve and including:
   - a wheel motion transducer, associated with a vehicle wheel, for generating wheel signals related to wheel rotation;
   - a brake force generator for actuating said wheel brakes with variable force;
   - a processor unit for receiving said wheel signals from said wheel motion transducer and for generating first control signals for said brake force generator;
   - at least one signal filter for receiving said first control signals from said processor unit and for generating second control signals which are selectively timed with respect to said first control signals; and
   - a timing circuit for receiving said first control signals and for generating filter switching signals which are applied to said signal filter to change the time constant thereof and cause said selective timing of said second control signals.

2. An anti-skid braking system as defined by claim 1, further comprising circuit means to receive said first control signals and for blocking any change of the time constant in said signal filter if two sequential first control signals are received without an intermediate pressure increase in said braking system.

3. An anti-skid braking system as defined in claim 2, further including pressure inlet means in said brake system and circuit means for determining if said pressure inlet valve was opened for at least a predetermined amount of time and for causing a signal to increase said time constant in said signal filter if said pressure inlet valve was not opened at least a predetermined period of time.

4. An anti-skid braking system as defined in claim 3, further comprising a memory for defining a particular filter time constant and a second timing circuit for actuating a gate if the vehicle brakes have not been actuated during a predetermined amount of time and if the vehicle has exceeded a predetermined speed.

5. An anti-skid braking system as defined in claim 1, wherein said at least one signal filter includes a plurality of discrete circuit components, each having a different time constant associated therewith, and each having said first control signals applied thereto, said discrete circuit components being selectively actuated to generate said second control signals, said second control signals being thereby selectively timed with respect to said first control signals.

6. An anti-skid braking system as defined in claim 5, wherein said timing circuit includes further switching means for generating further filter switching signals which are applied to said signal filter to set the signal filter at the termination of said first control signals in order that the discrete circuit component having the shortest time constant can be actuated for the next application of said first control signals.

7. An anti-skid braking system as defined in claim 1, wherein said timing circuit includes a timing element having a given timing constant, and means for generating a first output generating signal as a filter switching signal, and wherein the period of said first control signals is compared to the timing constant of said timing element such that when the period between first signals is smaller than said timing constant said first output generating signal is generated thereby causing an increase of the time constant in said signal filter.

8. An anti-skid braking system as defined in claim 7, wherein said timing circuit further includes a further timing element having a given timing constant, and means for generating a second output generating signals as a filter switching signal, and wherein the period of said first control signals is compared to the timing constant of said further timing element such that when the period between first signals is greater than the timing constant of said further timing element said second output generating signal is generated thereby causing a decrease of the time constant in said signal filter.

9. An anti-skid braking system as defined by claim 8, wherein said signals for increasing and decreasing said time constant are applied to said signal filter to initiate a stepwise increase and decrease, respectively.

10. An anti-skid braking system as defined in claim 8, further including a memory for receiving said output signals from said timing circuit and for generating a switching datum to be applied to said signal filter, said memory being engaged by said timing circuit.

* * * * *